United States Patent
Sharapov

(10) Patent No.: US 7,333,444 B1
(45) Date of Patent: Feb. 19, 2008

(54) METHOD AND APPARATUS FOR CREATING A ROBUST HIGHLY CONNECTED DIRECT INTERCONNECTION NETWORK

(75) Inventor: Ilya A. Sharapov, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 860 days.

(21) Appl. No.: 10/739,475

(22) Filed: Dec. 17, 2003

(51) Int. Cl.
*H04L 12/28* (2006.01)
(52) U.S. Cl. .................. 370/255; 370/389; 370/400; 370/408
(58) Field of Classification Search ........ 370/254–258, 370/418, 389, 400, 406–408
See application file for complete search history.

(56) References Cited

U.S. PATENT DOCUMENTS

| | | | |
|---|---|---|---|
| 5,191,578 A * | 3/1993 | Lee .................. | 370/418 |
| 5,280,474 A * | 1/1994 | Nickolls et al. ........ | 370/389 |
| 5,365,524 A * | 11/1994 | Hiller et al. .......... | 370/376 |
| 5,535,195 A * | 7/1996 | Lee .................. | 370/256 |
| 5,726,979 A * | 3/1998 | Henderson et al. ...... | 370/254 |
| 5,794,059 A * | 8/1998 | Barker et al. ......... | 712/10 |
| 5,926,463 A * | 7/1999 | Ahearn et al. ......... | 370/254 |
| 6,262,984 B1 * | 7/2001 | Rochberger ........... | 370/395.2 |
| 6,684,331 B1 * | 1/2004 | Srivastava ............ | 713/163 |
| 6,980,537 B1 * | 12/2005 | Liu ................... | 370/338 |
| 7,167,453 B1 * | 1/2007 | Chopping et al. ....... | 370/255 |

OTHER PUBLICATIONS

Breznay, Lopez, Thightly Connected Hierarchical Interconnection Networks for Parallel Processors, 1993,IEEE Computer Society,ICCP'93, pp. I-307 to I-310.*
Karam, O.H.; Agrawal, D.P.Design and Analysis of Generalized Link Extended Hierarchical Interconnection Networks, □□Parallel Processing Symposium, 1993, IEEE, Proceedings of Seventh International□□Apr. 13-16, 1993 pp. 643-649 □□.*

* cited by examiner

*Primary Examiner*—Edan Orgad
*Assistant Examiner*—Venkatesh Haliyur
(74) *Attorney, Agent, or Firm*—Park, Vaughan & Fleming LLP

(57) ABSTRACT

One embodiment of the present invention provides a system for generating an interconnection network. During operation, the system associates an n-bit binary identifier with each node in the interconnection network. The system also groups the n bits of each binary identifier into h overlapping sets $a_1, a_2, \ldots a_h$, wherein the sets $a_1, a_2, \ldots a_h$ cover all of the n bits. For each set $a_i$, the system forms fully connected clusters of nodes by creating a direct point-to-point link between any two nodes that have binary identifiers that differ in bits of the set $a_1$ but are the same in other bit positions. Note that by varying the amount of overlap and the pattern of overlap between the overlapping sets, $a_1, a_2, \ldots a_h$, the interconnection network can be configured to accommodate different redundancy requirements.

26 Claims, 4 Drawing Sheets

METHOD AND APPARATUS FOR CREATING A ROBUST HIGHLY CONNECTED DIRECT INTERCONNECTION NETWORK

GOVERNMENT LICENSE RIGHTS

This invention was made with United States Government support under Contract No. NBCH020055 awarded by the Defense Advanced Research Projects Administration. The United States Government has certain rights in the invention.

BACKGROUND

1. Field of the Invention

The present invention relates to the design of interconnection networks. More specifically, the present invention relates to a method and an apparatus for creating a robust and highly connected direct interconnection network with low diameter.

2. Related Art

Interconnection networks are widely used to integrate isolated computer system components together to form unified systems. For example, networks appear at various levels within computer systems, including: on-chip, in system interconnects, and in multi-system clusters.

In order to provide a high degree of connectivity with low communication latency, it is desirable to connect system components together into highly connected networks through direct point-to-point links. Highly connected networks have many desirable properties, including, low diameter, high bisection bandwidth, symmetry of the nodes, and high robustness with respect to link outages. Note that these properties are possible only in networks with high node degrees, which contain a large number of links.

It is also desirable for highly connected networks to be regular, scalable and have extra fabric for redundant paths between any two nodes. The latter characteristic is important for building robust, fault-tolerant networks or for networks with good load balancing properties. Note that the desired degree of redundancy largely depends on characteristics a specific network workload. Hence, it is preferable to develop a class of topologies that provide varying levels of redundancy that can be tailored for different workload requirements.

Cost and design complexity constraints can greatly affect design choices for specific network topologies. In particular, a topology with a very large number of links can be prohibitively expensive and impractical to build. Moreover, networks with large amounts of asymmetry between nodes may suffer from the complexity of the routing and from poor load balancing for some workloads.

Traditional network topologies, such as rings, meshes, and toriodal interconnects, provide only limited connectivity and consequently suffer from high network diameter and low bisection bandwidth. Hypercubes provide lower diameter and higher node degree, but still provide insufficient connectivity to satisfy large performance requirements. High fanout and fat-tree topologies do not provide desirable symmetry between nodes or low diameter (latency) and have limited robustness with respect to link outages.

What is needed is a method and an apparatus for generating highly connected networks in a manner that allows the network topology to be tuned to meet specific requirements of network usage.

SUMMARY

One embodiment of the present invention provides a system for generating an interconnection network. During operation, the system associates an n-bit binary identifier with each node in the interconnection network. The system also groups the n bits of each binary identifier into h overlapping sets $a_1, a_2, \ldots a_h$, wherein the sets $a_1, a_2, \ldots a_h$ cover all of the n bits. For each set $a_i$, the system forms fully connected clusters of nodes by creating a direct point-to-point link between any two nodes that have binary identifiers that differ in bits of the set $a_i$ but are the same in other bit positions. Note that by varying the amount of overlap and the pattern of overlap between the overlapping sets, $a_1, a_2, \ldots a_h$, the interconnection network can be configured to accommodate different redundancy requirements.

In a variation on this embodiment, each of the sets $a_1, a_2, \ldots a_h$ includes the same number of bits.

In a variation on this embodiment, each set $a_i$ includes at least one unique bit that does not belong to another set.

In a variation on this embodiment, the system can also select a minimal path between a first node and a second node by identifying a minimal subset of the sets $a_1, a_2, \ldots a_h$ which includes all of the bits that are different between the binary identifier for the first node and the binary identifier for the second node. Next, for each set $a_i$ in the minimal subset, the system selects a link from the fully connected cluster associated with $a_i$, such that the selected links form a minimal path between the first node and the second node.

In a further variation, if one or more failures make it impossible to form a minimal path between the first node and the second node, the system generates a non-minimal path between the first node and the second node, if possible, wherein the non-minimal path includes more than the minimal number of links (in the absence of failures) between the first node and the second node.

In a variation on this embodiment, each node in the interconnection network has degree $$D = \sum_{i=1}^{h} (2^{\|a_i\|} - 1),$$

wherein $\|a_i\|$ is the number of bits in the set $a_i$.

In a variation on this embodiment, for each set $a_i$ the system generates $2^{n-\|a_i\|}$ fully connected clusters of $2^{\|a_i\|}$ nodes.

In a variation on this embodiment, the total number of links in the interconnection network is $$\frac{N}{2} \sum_{i=1}^{h} (2^{\|a_i\|} - 1).$$

Hence, the present invention provides a flexible and scalable approach for creating highly connected network topologies with given redundancy requirements. The low diameter, symmetry, fault-tolerance, and good load-balancing properties of the resulting multi-level networks make them good candidates for interconnections between computational resources.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Network Generation Technique

We assume that the system has $N=2^n$ nodes and that n address bits are grouped in h possibly overlapping sets $a_1$, $a_2$, . . . , $a_h$. We define the connectivity in the system by linking any two nodes whose addresses differ only in subsets of $a_i$. If the sets $a_i$ span the entire range of address bits, $$\bigcup_{i=1}^{h} a_i = \{1, 2, \ldots, n\},$$

any two nodes can be connected in at most h links.

Figure 1:
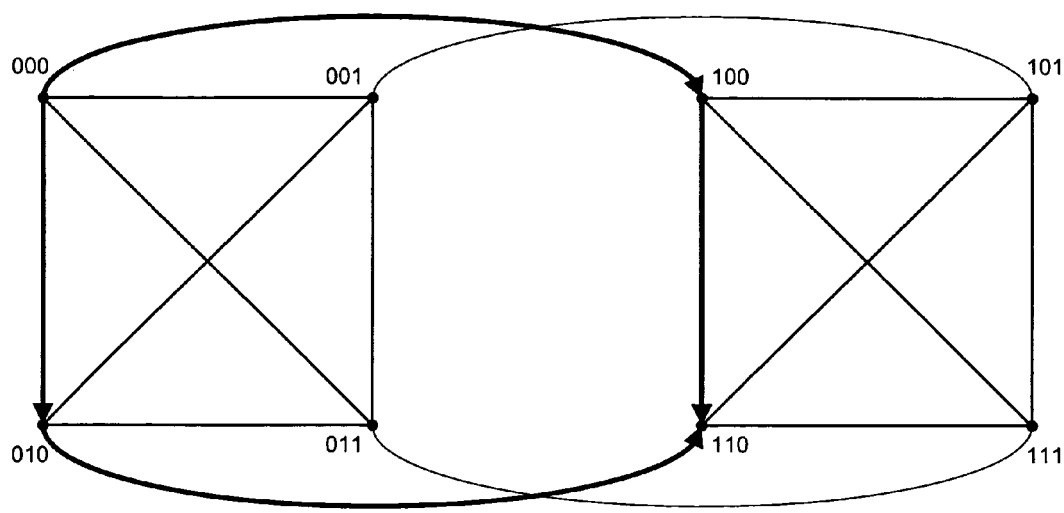
FIG. 1 illustrates a two-way redundant network for eight nodes in accordance with an embodiment of the present invention.

For example, if we have eight nodes (N=8, n=3), we can chose $a_1=\{1\}$ and $a_2=\{2, 3\}$. The links corresponding to $a_1$ connect pairs of nodes whose addresses match except for the first bit. The other group of links, the ones corresponding to $a_2$, connect the nodes whose addresses may differ in bit 2, bit 3, or both, in other words, whose addresses match in bit 1. Both groups of links are shown in FIG. 1 with curved and straight lines respectively. The diameter of this network is h=2 because any two nodes, which are not directly linked, can be connected in at most two hops by adjusting first and the last two bits of the address in either order (two-way redundancy). For example, the nodes (000) and (110) can be connected through the path (000)→(100)→(110), or through the path (000)→(010)→(110).

The all-to-all connectivity within the subsets of the network decreases its diameter and distinguishes this topology from a hypercube. A hypercube can be described in this framework as a topology formed by the sets $a_i$, each of which has one address bit. In our example, that would correspond to $a_1\{1\}$, $a_2=\{2\}$, and $a_3=\{3\}$. Another special case corresponds to the fully connected topology with $a_1=\{1, \ldots, n\}$.

The twofold redundancy may be insufficient in some cases. Fortunately, the redundancy can be increased by allowing the sets $a_i$ to overlap, which also increases the degree of the nodes in the network. If the combined bit count in the sets $a_i$ exceeds n we define the total overlap δ as $$\delta = \sum_{i=1}^{k} \|a_i\| - n.$$

Higher overlap leads to higher path redundancy between any two nodes, but leads to higher node degrees and higher link counts in the network. In the following section we look at these and other properties and their interdependencies.

Figure 2:
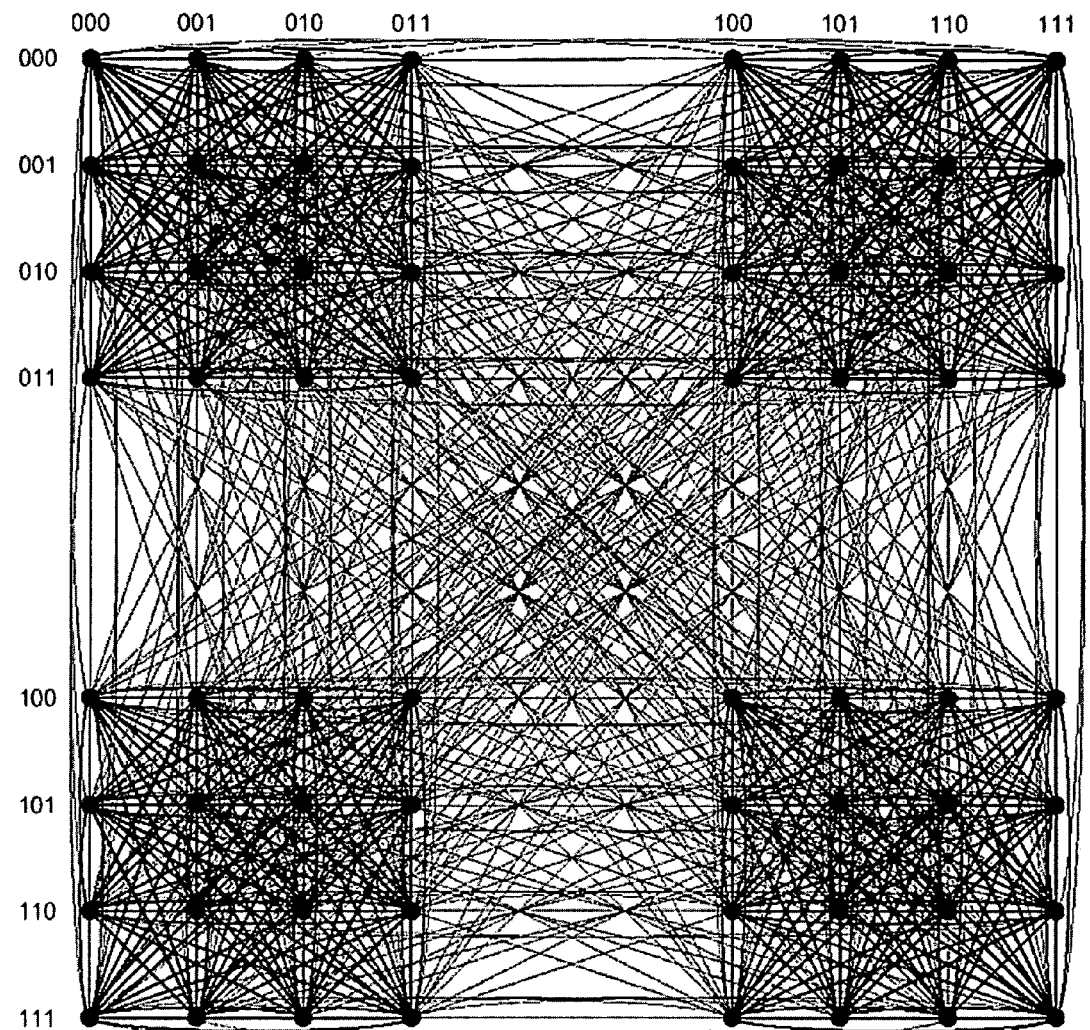
FIG. 2 illustrates an interconnection network for 64 nodes that uses two levels of fully connected 16-node clusters in accordance with an embodiment of the present invention.

A more complex example of an interconnection network appears in FIG. 2 which illustrates a 64-node network (n=6) with diameter h=2. In this example, the connectivity is based on the sets $a_1=\{2,3,5,6\}$ and $a_2=\{1,2,4,5\}$. The nodes in FIG. 2 are arranged by the lower and upper portions of their addresses. The lower and upper bit triplets are shown on the vertical and horizontal axes respectively. Links corresponding to the set $a_1$ are shown solid lines that provide full (all-to-all) connectivity in four 16-node square subsets formed by fixing the leading bits in address triplets. The links shown in dashed lines provide full connectivity for four 16-node sets, which in turn are formed by fixing the last bits in the triplets.

Properties of the Topology

Based on the way the links are generated, each set $a_i$ creates $2^{n-\|a_i\|}$ fully connected clusters of $2^{\|a_i\|}$ elements. Within a cluster each node connects to $2^{\|a_i\|}-1$ elements and since each of the nodes in the network is a part of one cluster for each of the sets $a_i$ the degree of each node is $$D = \sum_{i=1}^{h} (2^{\|a_i\|} - 1)$$

and the total number of links in the network is $$T = \frac{N}{2} \times D = \frac{N}{2} \times \sum_{i=1}^{h} (2^{\|a_i\|} - 1).$$

If the sets $a_i$ have the same number of elements, or $$\|a_i\| = \frac{n + \delta}{n}$$

for any i, the node degree and the combined number of links become $$D = h \times \left(2^{\frac{n+\delta}{h}} - 1\right) = h \times \left(\sqrt[h]{N \times 2^\delta} - 1\right) \text{ and}$$

$$T = \frac{N}{2} \times h \times \left(\sqrt[h]{N \times 2^\delta} - 1\right), \text{ respectively.}$$

To determine the redundancy properties of this network, or the number of ways any two nodes can be interconnected, we separately look at the minimal-path and non-minimal-path connections.

To determine the minimal path two nodes we have to find the minimal subset $a_{i_1}, \ldots, a_{i_k}$, that includes all the address bits different for the nodes. The resulting number of sets k is the number of links in the minimal path between the nodes, and the corresponding overlap $\delta_k$ between the sets $a_{i_1}, \ldots, a_{i_k}$ determines the redundancy of the minimal path:

$$R_k = k! \times 2^{\delta_k}.$$

The combinatorial factor k! is present because we have to update k groups of bits in any order. The overlap contributes additional factor of $2^{\delta_k}$.

The expression for R shows that any h-hop diameter of the network has a redundancy of $$R_h = h! \times 2^\delta.$$

On the other hand, if two nodes are directly linked (k=1 and $\delta_k$=0), the minimal single-hop path is unique.

To increase the redundancy (and bandwidth) for node-to-node communications and reduce network's vulnerability to link outages we can allow non-minimal path between the nodes. If any node-to-node connections can use up to h links, the path redundancy between non-diameter pairs will exceed the $R_h$ value above (assuming h>2 or $\delta$>0). This is the case because if a pair of nodes does not form a diameter (minimal path is shorter than h), instead of picking exactly one link corresponding to each $a_i$, we can pick multiple links from the same fully connected cluster increasing the combinatorial component in the redundancy expression.

If the redundancy $R_h = h! \times 2^\delta$ is insufficient, we can allow more than h-hop node-to-node communication effectively increasing the diameter of the network. For h'-hop connectivity, where h'>h exceeds the diameter of the network the node-to-node redundancy is $$R_{h'} = \frac{h'!}{(h'-h)!} \times 2^\delta \times 2^{(h'-h) \times \max_i \|a_i\|}$$

If h' is low (h'<<n), the network is highly connected and we can characterize the bisection of the network as a fraction of the total number of links. It is easy to show that for any node and any cross-section, half of h'-stage connections cross the bisection. This leads to the bisection expression $$B_{h'} = \frac{T}{2 \times h'} = \frac{1}{2 \times h'} \times \frac{N}{2} \times \sum_{i=1}^{h} (2^{\|a_i\|} - 1).$$

Process of Creating an Interconnection Network

Figure 3:
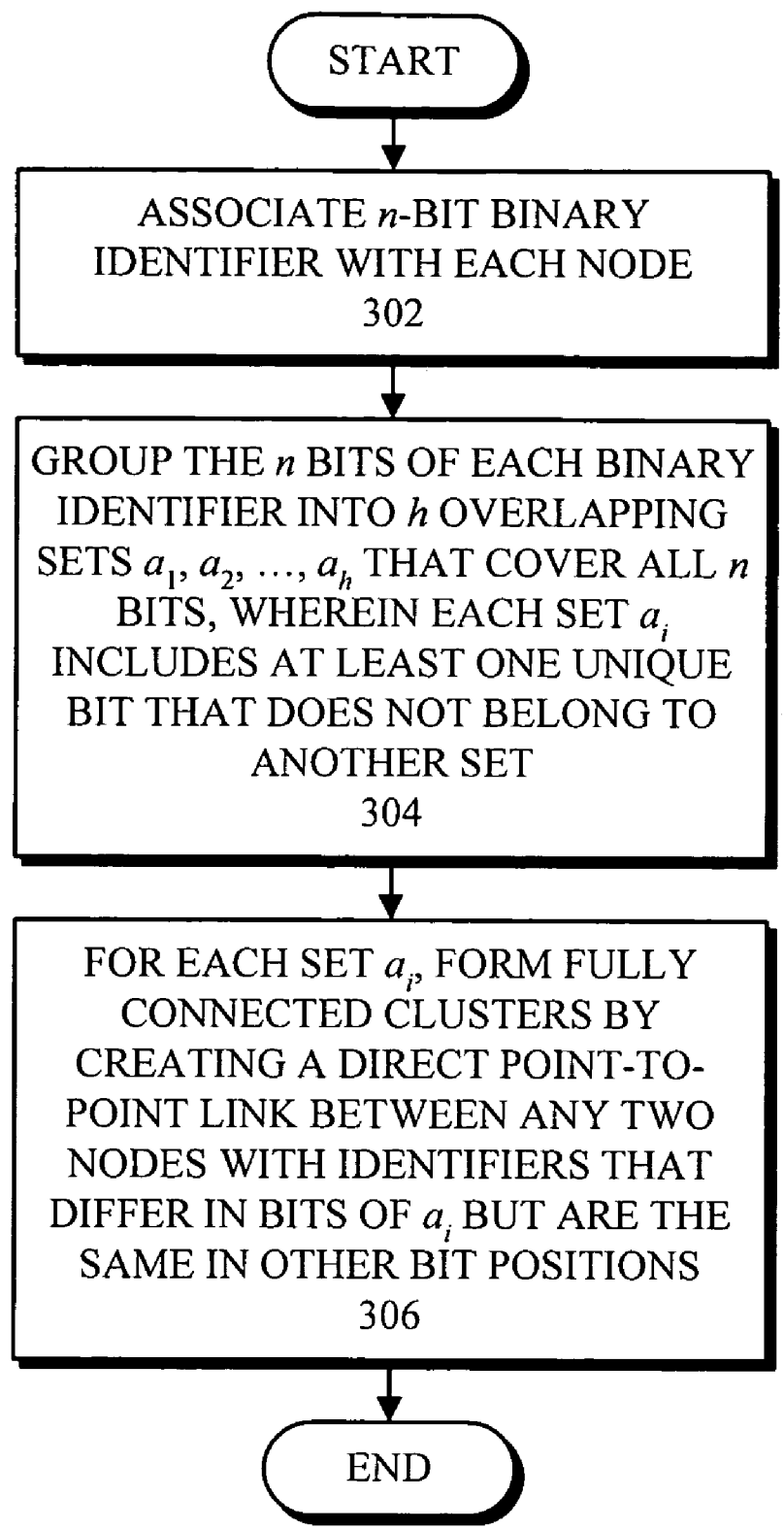
FIG. 3 presents a flow chart for the process of creating an interconnection network in accordance with an embodiment of the present invention.

FIG. 3 presents a flow chart for the process of creating an interconnection network in accordance with an embodiment of the present invention. The system starts by associating an n-bit binary identifier with each node in the interconnection network (step 302).

Next, the system groups the n bits of each binary identifier into h overlapping sets $a_1, a_2, \ldots a_h$, wherein the sets $a_1, a_2, \ldots a_h$ cover all of the n bits, and wherein each set $a_i$ includes at least one unique bit that does not belong to another set (step 304). Note that the magnitude of the overlapping determines the redundancy of the resulting network.

Then, for each set $a_i$, the system forms fully connected clusters of nodes by creating a direct point-to-point link between any two nodes that have binary identifiers that differ in bits of the set $a_i$ but are the same in other bit positions (step 306).

Process of Identifying a Path Through an Interconnection Network

Figure 4:
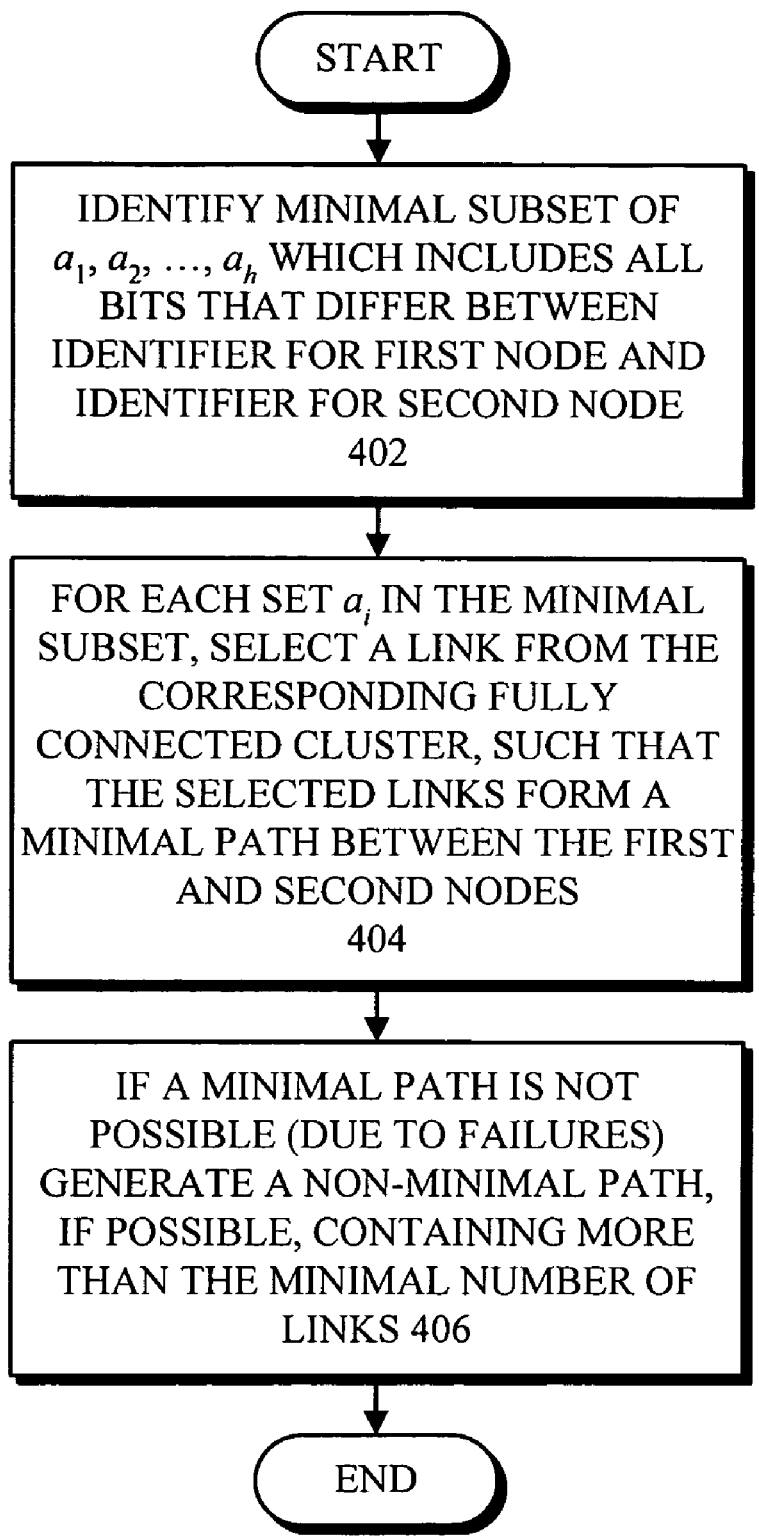
FIG. 4 presents a flow chart for the process of identifying a minimal path between two nodes in the interconnection network in accordance with an embodiment of the present invention.

FIG. 4 presents a flow chart illustrating the process of identifying a minimal path between two nodes in the interconnection network in accordance with an embodiment of the present invention. The system starts by identifying a minimal subset of $a_1, a_2, \ldots a_h$ which includes all of the bits that are different between the binary identifier for the first node and the binary identifier for the second node (step 402). Next, for each set $a_i$ in the minimal subset, the system selects a link from the fully connected cluster associated with $a_i$, such that the selected links form a minimal path between the first node and the second node (step 404).

If one or more failures make it impossible to form a minimal path between the first node and the second node, the system generates a non-minimal path between the first node and the second node, if possible, wherein the non-minimal path includes more than the minimal number of links (in the absence of failures) between the first node and the second node (step 406).

CONCLUSIONS

The above-described techniques can be used to create a highly connected network topology for a given number of nodes in a manner that satisfies a given redundancy requirements. This network topology is based on multiple levels of all-to-all clustering within subsets of the overall network. The address bit overlaps between the clusters lead to increased redundancy for node-to-node communication. Large overlaps lead to higher node degrees and higher link count in the network. If these parameters reach practical limits and resulting redundancy is insufficient for given robustness or load balancing requirements, further redundancy increases can be achieved by allowing non-minimal path communications in the network. The combination of using bit overlap and non-minimal paths leads to a flexible framework for creating topologies with given robustness, high bisection bandwidth, and low diameter.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating an interconnection network, comprising:

associating an n-bit binary identifier with each node in the interconnection network;

grouping the n bits of each binary identifier into h overlapping sets $a_1, a_2, \ldots a_h$, wherein the sets $a_1, a_2, \ldots a_h$ cover all of the n bits; and for each set $a_i$, forming fully connected clusters of nodes by creating a direct point-to-point link between any two nodes that have binary identifiers that differ in bits of the set $a_i$ but are the same in other bit positions;

wherein for each set $a_i$, forming fully connected clusters involves generating $2^{n-\|a_i\|}$ fully connected clusters of $2^{\|a_i\|}$ nodes, wherein $\|a_i\|$ is the number of bits in the set $a_i$; and wherein the symbols "n", and "h" represent non-negative integer values.

2. The method of claim 1, wherein each of the sets $a_1, a_2, \ldots a_h$ includes the same number of bits.

3. The method of claim 2, wherein each set $a_i$ includes at least one unique bit that does not belong to another set.

4. The method of claim 1, further comprising determining a minimal path between a first node and a second node by:

identifying a minimal subset of the sets $a_1, a_2, \ldots a_h$ which includes all of the bits that are different between the binary identifier for the first node and the binary identifier for the second node; and for each set $a_i$ in the minimal subset, selecting a link from the fully connected cluster associated with $a_i$, such that the selected links form a minimal path between the first node and the second node.

5. The method of claim 4, wherein if one or more failures make it impossible to form a minimal path between the first node and the second node, the method further comprises generating a non-minimal path between the first node and the second node, if possible, wherein the non-minimal path includes more than the minimal number of links (in the absence of failures) between the first node and the second node.

6. The method of claim 1, wherein each node in the interconnection network has degree $$D = \sum_{i=1}^{h} (2^{\|a_i\|} - 1),$$

wherein $\|a_i\|$ is the number of bits in the set $a_i$, and wherein the symbol "D" represents a non-negative integer value that denotes the total number of links to a node.

7. The method of claim 1, wherein the total number of links in the interconnection network is $$\frac{N}{2} \sum_{i=1}^{h} (2^{\|a_i\|} - 1),$$

wherein $\|a_i\|$ is the number of bits in the set $a_i$, and wherein the symbol "N" represents a non-negative integer value that denotes the total number of links in the interconnection network.

8. A computer-readable storage medium storing instructions that when executed by a computer cause the computer to perform a method for creating an interconnection network, the method comprising:

associating an n-bit binary identifier with each node in the interconnection network;

grouping the n bits of each binary identifier into h overlapping sets $a_1, a_2, \ldots a_h$, wherein the sets $a_1, a_2, \ldots a_h$ cover all of the n bits; and for each set $a_i$, forming fully connected clusters of nodes by creating a direct point-to-point link between any two nodes that have binary identifiers that differ in bits of the set $a_i$ but are the same in other bit positions;

wherein for each set $a_i$, forming fully connected clusters involves generating $2^{n-\|a_i\|}$ fully connected clusters of $2^{\|a_i\|}$ nodes wherein $\|a_i\|$ is the number of bits in the set $a_i$; and wherein the symbols "n", and "h" represent non-negative integer values.

9. The computer-readable storage medium of claim 8, wherein each of the sets $a_1, a_2, \ldots a_h$ includes the same number of bits.

10. The computer-readable storage medium of claim 9, wherein each set $a_i$ includes at least one unique bit that does not belong to another set.

11. The computer-readable storage medium of claim 8, wherein the method further comprises determining a minimal path between a first node and a second node by:

identifying a minimal subset of the sets $a_1, a_2, \ldots a_h$ which includes all of the bits that are different between the binary identifier for the first node and the binary identifier for the second node; and for each set $a_i$ in the minimal subset, selecting a link from the fully connected cluster associated with $a_i$, such that the selected links form a minimal path between the first node and the second node.

12. The computer-readable storage medium of claim 11, wherein if one or more failures make it impossible to form a minimal path between the first node and the second node, the method further comprises generating a non-minimal path between the first node and the second node, if possible, wherein the non-minimal path includes more than the minimal number of links (in the absence of failures) between the first node and the second node.

13. The computer-readable storage medium of claim 8, wherein each node in the interconnection network has degree $$D = \sum_{i=1}^{h} (2^{\|a_i\|} - 1),$$

wherein $\|a_i\|$ is the number of bits in the set $a_i$, and wherein the symbol "D" represents a non-negative integer value that denotes the total number of links to a node.

14. The computer-readable storage medium of claim 8, wherein the total number of links in the interconnection network is $$\frac{N}{2} \sum_{i=1}^{h} (2^{\|a_i\|} - 1),$$

wherein $\|a_i\|$ is the number of bits in the set $a_i$, and wherein the symbol "N" represents a non-negative integer value that denotes the total number of links in the interconnection network.

15. An apparatus that creates an interconnection network, comprising:

an association mechanism configured to associate an n-bit binary identifier with each node in the interconnection network;

a grouping mechanism configured to group the n bits of each binary identifier into h overlapping sets $a_1$, $a_2, \ldots a_h$, wherein the sets $a_1, a_2, \ldots a_h$ cover all of the n bits; and a connecting mechanism, wherein for each set $a_i$, the connecting mechanism is configured to form fully connected clusters of nodes by creating a direct point-to-point link between any two nodes that have binary identifiers that differ in bits of the set $a_i$ but are the same in other bit positions;

wherein for each set $a_i$, forming fully connected clusters involves generating $2^{n-\|a_i\|}$ fully connected clusters of $2^{\|a_i\|}$ nodes, wherein $\|a_i\|$ is the number of bits in the set $a_i$; and wherein the symbols "n", and "h" represent non-negative integer values.

16. The apparatus of claim 15, wherein each of the sets $a_1$, $a_2, \ldots a_h$ includes the same number of bits.

17. The apparatus of claim 16, wherein each set $a_i$ includes at least one unique bit that does not belong to another set.

18. The apparatus of claim 15, further comprising path generator configured to determine a minimal path between a first node and a second node by:

identifying a minimal subset of the sets $a_1, a_2, \ldots a_h$ which includes all of the bits that are different between the binary identifier for the first node and the binary identifier for the second node; and for each set $a_i$ in the minimal subset, selecting a link from the fully connected cluster associated with $a_i$, such that the selected links form a minimal path between the first node and the second node.

19. The apparatus of claim 18, wherein if one or more failures make it impossible to form a minimal path between the first node and the second node, the path generator is additionally configured to generate a non-minimal path between the first node and the second node, if possible, wherein the non-minimal path includes more than the minimal number of links (in the absence of failures) between the first node and the second node.

20. The apparatus of claim 15, wherein each node in the interconnection network has degree $$D = \sum_{i=1}^{h} (2^{\|a_i\|} - 1),$$

wherein $\|a_i\|$ is the number of bits in the set $a_i$, and wherein the symbol "D" represents a non-negative integer value that denotes the total number of links to a node.

21. The apparatus of claim 15, wherein the total number of links in the interconnection network is $$\frac{N}{2} \sum_{i=1}^{h} (2^{\|a_i\|} - 1),$$

wherein $\|a_i\|$ is the number of bits in the set $a_i$, and wherein the symbol "N" represents a non-negative integer value that denotes the total number of links in the interconnection network.

22. An interconnection network, comprising:

a plurality of nodes, wherein each node is associated with a unique an n-bit binary identifier;

wherein the n bits of each binary identifier are grouped into h overlapping sets $a_1, a_2, \ldots a_h$, wherein the sets $a_1, a_2, \ldots a_h$ cover all of the n bits; and a plurality of direct point-to-point links that form fully connected clusters between nodes in the plurality of nodes, wherein for each set $a_i$, there exists a link between nodes that have binary identifiers that differ in bits of the set $a_i$ but are the same in other bit positions, and wherein there do not exist other links;

wherein for each set $a_i$, forming fully connected clusters involves generating $2^{n-\|a_i\|}$ fully connected clusters of $2^{\|a_i\|}$ nodes wherein $\|a_i\|$ is the number of bits in the set $a_i$; and wherein the symbols "n", and "h" represent non-negative integer values.

23. The interconnection network of claim 22, wherein each of the sets $a_1, a_2, \ldots a_h$ includes the same number of bits.

24. The interconnection network of claim 22, wherein each set $a_i$ includes at least one unique bit that does not belong to another set.

25. The interconnection network of claim 22, wherein each node in the interconnection network has degree $$D = \sum_{i=1}^{h} (2^{\|a_i\|} - 1),$$

wherein $\|a_i\|$ is the number of bits in the set $a_i$, and wherein the symbol "D" represents a non-negative integer value that denotes the total number of links to a node.

26. The interconnection network of claim 22, wherein the total number of links in the interconnection network is $$\frac{N}{2} \sum_{i=1}^{h} (2^{\|a_i\|} - 1),$$

wherein $\|a_i\|$ is the number of bits in the set $a_i$, and wherein the symbol "N" represents a non-negative integer value that denotes the total number of links in the interconnection network.

* * * * *